(12) United States Patent
Gallagher et al.

(10) Patent No.: US 7,793,521 B2
(45) Date of Patent: Sep. 14, 2010

(54) METHOD ENABLING DUAL PRESSURE CONTROL WITHIN FIBER PREFORM DURING FIBER FABRICATION

(75) Inventors: Michael Thomas Gallagher, Corning, NY (US); Daniel Warren Hawtof, Corning, NY (US); Joseph Edward McCarthy, Addison, NY (US); Natesan Venkataraman, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 97 days.

(21) Appl. No.: 11/366,654

(22) Filed: Mar. 1, 2006

(65) Prior Publication Data

US 2007/0204656 A1    Sep. 6, 2007

(51) Int. Cl.
*C03B 37/023* (2006.01)
(52) U.S. Cl. .......................................... 65/379; 65/393
(58) Field of Classification Search ................ 65/379, 65/393, 411
See application file for complete search history.

(56) References Cited

U.S. PATENT DOCUMENTS

| 4,046,537 | A | * | 9/1977 | Deserno et al. ............... 65/403 |
| 4,931,076 | A | * | 6/1990 | Berkey ........................ 65/402 |
| 5,167,684 | A | * | 12/1992 | Turpin et al. ................. 65/379 |
| 5,802,236 | A | | 9/1998 | DiGiovanni et al. ........ 385/127 |
| 6,526,209 | B1 | | 2/2003 | Hasegawa et al. ........... 385/127 |
| 6,636,677 | B2 | | 10/2003 | Hasegawa et al. ........... 385/127 |
| 6,766,088 | B2 | | 7/2004 | Hasegawa et al. ........... 385/123 |
| 6,801,698 | B2 | | 10/2004 | King et al. .................. 385/123 |
| 6,850,679 | B2 | | 2/2005 | Hasegawa .................... 385/125 |
| 6,888,992 | B2 | | 5/2005 | Russell et al. ............... 385/125 |
| 6,892,018 | B2 | | 5/2005 | Libori et al. ................ 385/127 |
| 6,895,155 | B2 | | 5/2005 | Gasca et al. ................ 385/125 |
| 6,898,359 | B2 | | 5/2005 | Soljacic et al. ............. 385/123 |
| 6,996,317 | B2 | | 2/2006 | Eggleton et al. ............ 385/125 |
| 2002/0118938 | A1 | | 8/2002 | Hasegawa et al. ........... 385/125 |

(Continued)

FOREIGN PATENT DOCUMENTS

WO    WO 2004/053550    6/2004

OTHER PUBLICATIONS http://www.answers.com/topic/circumference?cat=technology webpage as of Jun. 20, 2008, pp. 1-4.*

(Continued)

*Primary Examiner*—John Hoffmann
(74) *Attorney, Agent, or Firm*—Robert L. Carlson; Matthew J. Mason

(57) ABSTRACT

A method of fabricating a photonic crystal or photonic band gap optical fiber comprises providing a preform that includes a plurality of holes in an outer diameter, wherein the holes extend from a first end of a preform to a second end of the preform, and forming at least one radially inwardly-extending slot within the preform such that the slot intersects at least some of the holes, wherein the slot does not intersect at least one hole. The method also includes establishing a first pressure in the holes intersected by the slot by introducing the first pressure to the slot, and establishing a second pressure in the at least one hole not intersected by the slot by introducing the second pressure to an end of the at least one hole not intersected by the slot. The method further includes drawing the preform into a fiber while independently controlling the first and second pressures.

20 Claims, 3 Drawing Sheets

U.S. PATENT DOCUMENTS

| | | | |
|---|---|---|---|
| 2003/0230118 A1 | 12/2003 | Dawes et al. | 65/379 |
| 2004/0096173 A1* | 5/2004 | Fekety et al. | 385/125 |
| 2004/0179796 A1* | 9/2004 | Jakobsen et al. | 385/123 |
| 2005/0238301 A1 | 10/2005 | Russell et al. | 385/113 |
| 2006/0133753 A1* | 6/2006 | Nelson et al. | 385/125 |

OTHER PUBLICATIONS http://www.thefreedictionary.com/circumference as of Jun. 20, 2008, pp. 1-4.*

* cited by examiner

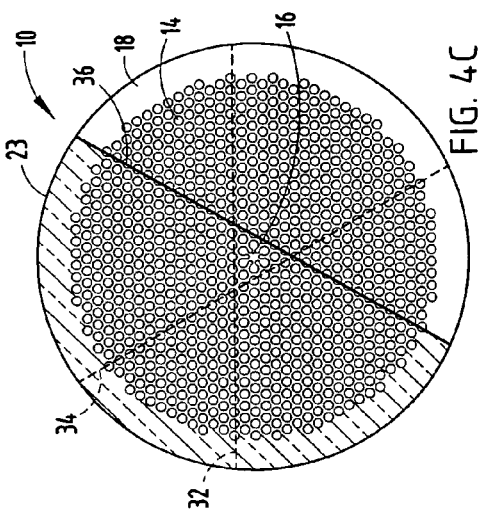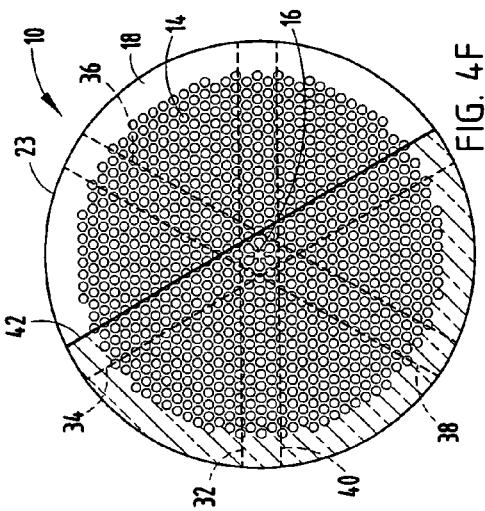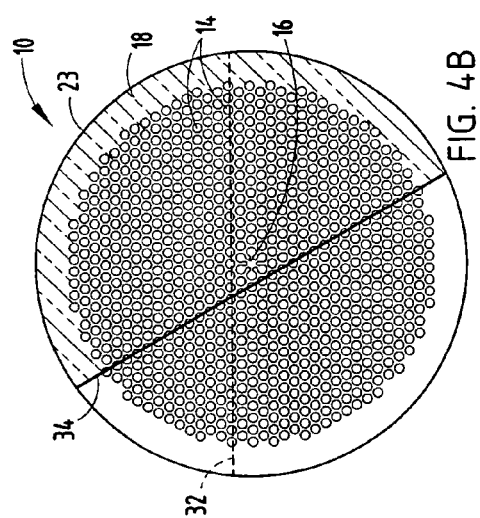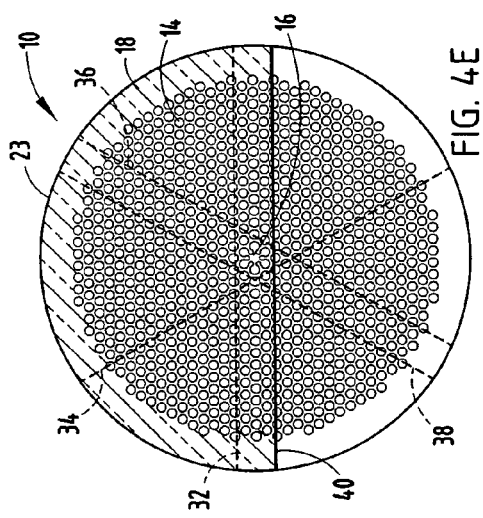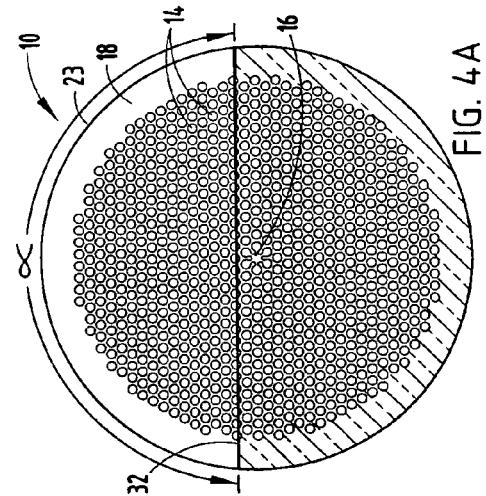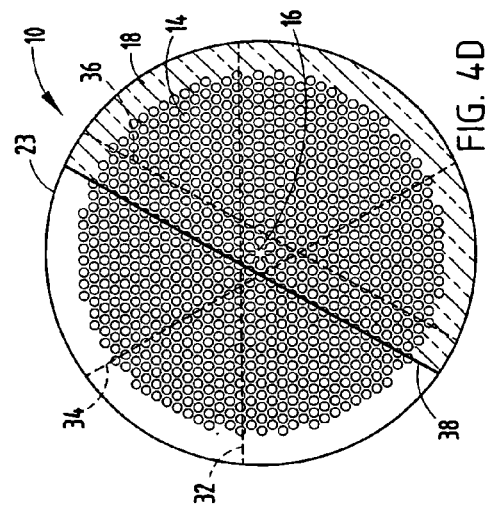

METHOD ENABLING DUAL PRESSURE CONTROL WITHIN FIBER PREFORM DURING FIBER FABRICATION

BACKGROUND OF THE INVENTION

1. Field of the Invention

The invention is directed to a method of fabricating a photonic crystal optical fiber or photonic band gap fiber, and in particular to a method providing independent control of pressures within a plurality of longitudinally-extending holes within a preform during the draw of the preform into the optical fiber.

2. Technical Background

Optic fibers are used in a wide variety of fields, including telecommunications, laser machining and welding, laser beam and power delivery, fiber lasers, etc. Typically, fibers are constructed from solid transparent materials such as glass and have a similar cross-sectional configuration along the length thereof. An alternative design to such fibers includes a microstructured optical fiber having holes or voids running longitudinally along the fiber axis. These holes generally contain air or an inert gas, but may also contain other materials.

Microstructured optical fibers may be designed to optimize a wide variety of properties, and are useful in numerous applications. For example, microstructured optical fibers may include solid glass core and a plurality of holes disposed in a cladding region around the core in a manner wherein the position and sizes of the holes are designed to yield dispersion values ranging between large negative values and large positive values. These particular fibers are useful in applications requiring dispersion compensation. Solid-core microstructured optical fibers may also be designed to provide a single mode wave guidance over a wide range of wavelengths. The majority of solid-core microstructured optical fibers guide light by a total internal reflection mechanism, wherein a low index of the associated holes act to lower the index of the cladding region in which they are disposed.

Another form of microstructured optical fibers includes photonic band gap fibers that guide light by a mechanism that is fundamentally different from the total internal reflection mechanism. Photonic band gap fibers have a photonic crystal structure formed in the cladding of the fiber, wherein the photonic crystal structure comprises a periodic array of holes. A core of the fiber is formed by a defect in the photonic crystal structure cladding. For example, the defect may include a hole of a substantially different size and/or shape than the holes of the photonic crystal structure. Typically, photonic band gap fibers are constructed with a hollow air core surrounded by a cladding structure that consists of a periodic array of air holes within the glass.

The photonic crystal structure of the microstructured optical fibers has a range of frequencies, known as the band gap, within which light cannot propagate within the photonic crystal structure. In application, light introduced into the core of the fiber having a frequency within the band gap will not propagate in the photonic crystal cladding, and will therefore be confined within the core. A photonic band gap fiber may have a core that is formed from a hole larger than those of the photonic crystal structure. The key aspect of the hollow core photonic band gap technology is the production of a fiber with an air core having a low non-linearity and low attenuation. Specifically, the light is guided within a gaseous medium, lowering the losses due to absorption and rayleigh scattering associated with the glass materials. As light is guided in a gaseous medium, the hollow-core fiber may be constructed to provide extremely low non-linearity. Moreover, hollow-core microstructured optical fibers are well-suited for guiding light over a very broad range of wavelengths. Advantages of such a fiber include the application within high power transmission at wavelengths of from UV to IR range, such as within welding, lithography, cutting industries, and the like, and also for applications requiring ultra-low loss transmission of telecommunication signals.

Microstructured optical fibers are fabricated using methods roughly analogous to the manufacture of all-glass optical fibers. A preform having the desired arrangement of holes is formed, then drawn into fiber using heat and tension. During the drawing process, the size, shape and arrangement of the holes may be significantly distorted depending on the viscosity of the material and surface tension within the holes. Such distortions are especially damaging in hollow-core photonic band gap fibers, as the band gap may be quite sensitive to variations in characteristic dimensions of the photonic crystal structure such as hole size, pitch and symmetry. Such distortions can also affect the geometry of the core/cladding boundary which can in turn have a significant effect on the attenuation behavior of the guided mode.

Heretofore, the manufacturing process utilized to manufacture hollow-core microstructured optical fibers have been difficult to reproduce, relatively expensive, and time consuming. As the skilled artisan will appreciate, the holes of the preform used to make microstructured optical fibers can be quite small (e.g. less than a few hundred microns in diameter), and coupling the numerous holes of the microstructured optical fiber preform to different pressure systems is not a trivial task. A method is desired that enables improved control of the fiber geometry and yet is still practical, robust and repeatable, thereby reducing the overall time, cost and complexity associated with the manufacture of hollow-core microstructured optical fibers.

SUMMARY OF THE INVENTION

One aspect of the present invention relates to a method of fabricating a photonic crystal optical fiber, wherein the method comprises providing a preform that includes a plurality of holes and an outer surface, the holes extending from a first end of the preform to a second end of the preform, and forming at least one radially inwardly-extending slot within the preform such that the at least one slot intersects at least some of the holes, wherein the slot does not intersect at least one hole. The method also comprises establishing a first pressure in the holes intersected by the at least one slot by introducing the first pressure to the at least one slot, and establishing a second pressure in the at least one hole not intersected by the at least one slot by introducing the second pressure to an end of the at least one hole not intersected by the at least one slot. The method further comprises drawing the preform into a fiber while independently controlling the first and second pressures.

Another aspect of the present invention relates to a method of fabricating a photonic crystal or photonic band gap optical fiber, wherein the method comprises providing a plurality of elongate glass tubes, each having a longitudinal axis, a first end and a second end, at least some of the glass tubes being capillaries each having a hole parallel to the longitudinal axis of the glass tube and running from the first end of the glass tube to the second end of the glass tube, forming the glass tubes into a stack, the glass tubes being arranged such that the longitudinal axis of each of the glass tubes is substantially parallel to one another, and heating and reducing the diameter (i.e., drawing) the stack to form a preform, wherein the preform has a first end and a second end. The method may also comprise closing at least some of the holes of the preform at the first end of the preform by heating and deforming a first end of the preform, and forming a plurality of radially inwardly extending and longitudinally spaced slots within the preform such that each of the slots intersects some of the holes, thereby providing pneumatic communication between the outer surface of the preform and the holes, wherein the slots do not intersect all of the glass holes. The method further comprises securing a first tube to the first end of the preform such that the first tube is in pneumatic communication with at least some of the holes of the preform not intersected by the slots, and securing a second tube about the outer surface of the preform such that the second tube is in pneumatic communication with the slots. The method still further comprises establishing a first pressure in the holes intersected by the slots by introducing the first pressure to the slots through the second tube, establishing a second pressure in the holes of the glass tubes not intersected by the slots by introducing a second pressure through the first tube, and drawing the preform into a fiber while independently controlling the first and second pressures. This independent control of the first and second pressures facilitates close control of the hole size, pitch, core size and the shape of the core.

The present inventive methods disclosed herein allow practical, robust and repeatable solutions for manufacturing hollow-core microstructured optical fibers. These methods reduce the time, expense and complexity of the process normally associated with the manufacture of hollow-core microstructured optical fibers and are particularly well suited for the proposed use.

BRIEF DESCRIPTION OF THE DRAWINGS

FIG. 4A is a cross-sectional view of the preform taken along the line IVA-IVA, FIG. 3;

FIG. 4B is a cross-sectional view of the preform taken along the line IVB-IVB, FIG. 3;

FIG. 4C is a cross-sectional view of the preform taken along the line IVC-IVC, FIG. 3;

FIG. 4D is a cross-sectional view of the preform taken along the line IVD-IVD, FIG. 3;

FIG. 4E is a cross-sectional view of the preform taken along the line IVE-IVE, FIG. 3;

FIG. 4F is a cross-sectional view of the preform taken along the line IVF-IVF, FIG. 3.

DETAILED DESCRIPTION OF THE PREFERRED EMBODIMENTS

Figure 1:
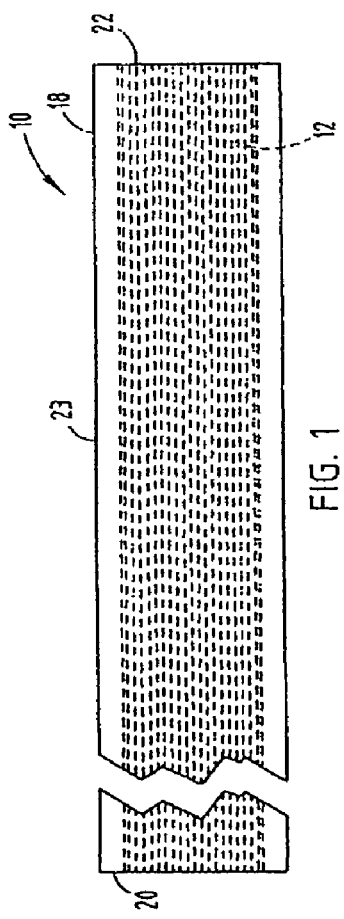
FIG. 1 is a side view of a preform to be formed into a hollow-core microstructured optical fiber.
Figure 3:
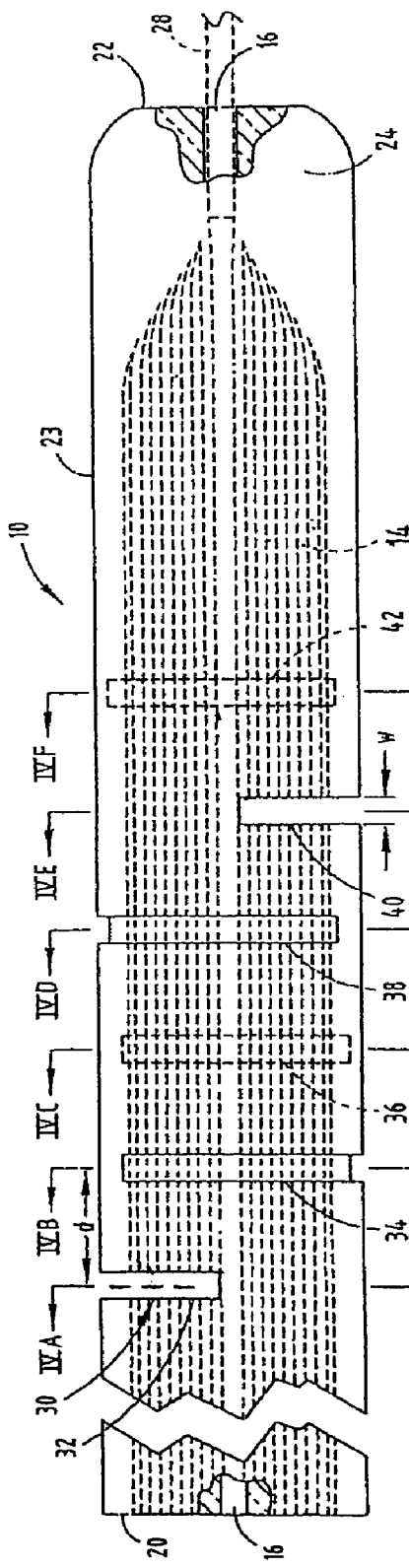
FIG. 3 is a partially cross-sectional side view of the preform, wherein holes extending longitudinally through the preform have been closed at one end thereof, and wherein an alternative graphite rod is shown in dashed lines.
Figure 5:
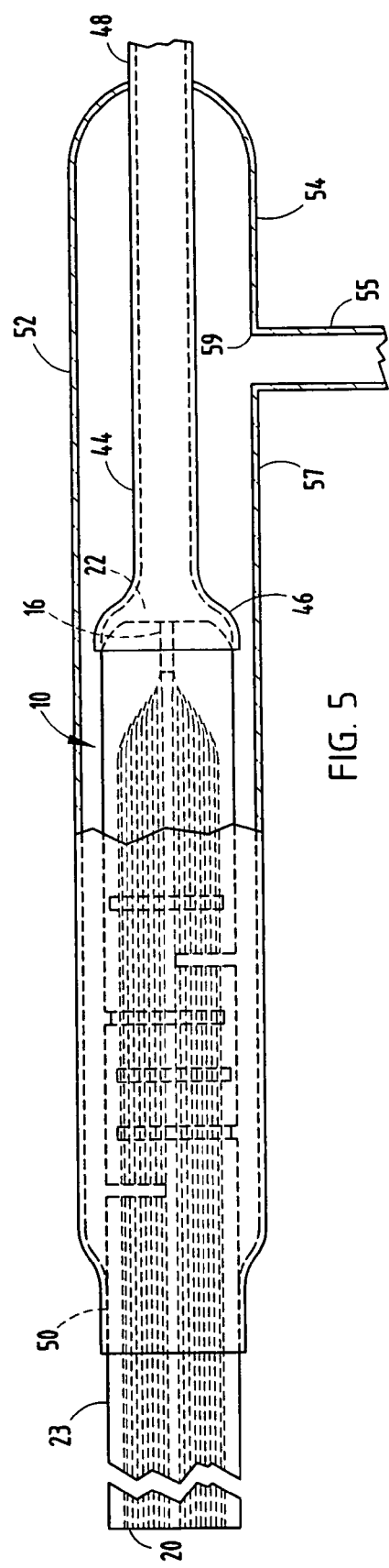
FIG. 5 is a partially cross-sectional side view of the preform as coupled to first and second pressure tubes.

For purposes of description herein, the terms "upper," "lower," "right," "left," "rear," "front," "vertical," "horizontal," and derivatives thereof shall relate to the invention as oriented in FIGS. 1, 3 and 5. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

In one aspect of the present invention, a method for forming a microstructured optical fiber is provided. In this method, a preform having a plurality of holes and an outer surface is provided, wherein the holes extend from a first end of the preform to a second end of the preform. A plurality of radially inwardly-extending slots are formed within the preform such that the slots intersect a number of the holes of the preform, and such that the slots do not intersect every one of the holes within the preform. A first pressure is then established within the holes intersected by the slots by introducing the first pressure to the slots, while a second pressure is established within the holes not intersected by the slots by introducing the second pressure to an end of those holes. The preform is then drawn into a fiber while the first and second pressures are independently controlled, thereby allowing the sizes, pitch, etc. of the holes to be controlled during the drawing of the fiber, as discussed in more detail below.

Figure 2:
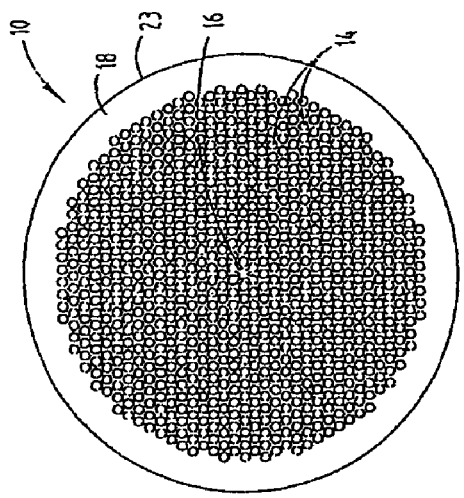
FIG. 2 is an end view of the preform.

The reference numeral 10 (FIG. 1) generally designates an optical fiber preform for the production of a photonic crystal optical fiber. The preform 10 is constructed of a bundle of capillaries 12 each including a longitudinally-extending hole 14 (FIG. 2). In the illustrated example, each of the holes 14 is hollow and includes a gaseous medium therein, however, it should be noted that at least some of the holes may include other refractive materials therein. In the embodiment illustrated, the capillaries 12 are arranged in a manner so as to create a centrally-located, longitudinally-extending hollow core 16, the shape of which illustrates the difficulty in pneumatically coupling gas supply lines therewith. However, other designs could be employed, for example wherein the core is not centrally located, or wherein multiple cores (either symmetrically or non-symmetrically disposed around the center of the fiber) are employed. The plurality of holes 14 of the capillaries 12 forms an effective index cladding region for the core 16. In assembly, a bundle of capillaries 12 is positioned within a large sleeve tube or glass jacket 18. Specifically, the initial optical fiber preform 10 is formed by arranging a stack of glass tubes, at least some of which are capillaries 12 that include the holes 14, positioning the glass tubes within the large sleeve tube 18, and heating and drawing (reducing the diameter of) the assembly to form the integral preform 10 with holes 14 still retained therein. Once formed, the preform 10 defines a first end 22, a second end 20 and an outer surface 23 with holes 14 still retained within the preform 10. It is noted that the relative size of the sleeve tube 18 with respect to the over size of the bundle of capillaries 12, and that the illustrated examples may not be shown to scale.

As best illustrated in FIG. 3, a pressurized gas, such as helium, is introduced into the core 16 at the second end 20 of the preform 10 while the first end 22 of the preform 10 is heated so as to allow deformation of the same. Preferably the pressurized gas is an inert gas such as helium, argon, or nitrogen, or a mixture thereof. The first end 22 of preform 10 is heated until the preform is sufficiently hot enough to close off the holes 14 within an end region 24 proximate the first end 22. In the illustrated example, the holes 14 are closed such that any air pressures supplied to the first end 22 of the preform 10 enter the core 16 but are prevented from entering the holes 14, as discussed below.

Alternatively, a plug 28 such as for example, a graphite rod, can be inserted into the hollow core 16 prior to the heating of the first end 22 of the preform 10, thereby preventing closure of the hollow core 16 when the end region 24 is heated and deformed so as to close the holes 14. Subsequent to closing the holes 14, a heated gas, such as oxygen, is preferably introduced to the hollow core 16 via the second end 20 of the preform 10, thereby allowing removal of the graphite rod 28 from within the core 16. Alternatively, a sufficient amount of heat may also be externally applied to the end region 24 subsequent to the deformation and cooling of the same, thereby allowing removal of the graphite rod 28.

A plurality of radially inwardly-extending slots 30 are formed within the preform 10. In the illustrated example, a total of six slots 32, 34, 36, 38, 40, 42 are formed. However, more or less slots could be employed as desired. Each slot 32, 34, 36, 38, 40, 42 intersect a number of the holes 14, thereby allowing pneumatic communication with the holes 14, as described below. It is noted that a single slot may be formed so as to intersect 360° of the outer surface 23 of the preform 10 and intersect with each and every hole 14 of the preform 10. Preferably, at least two slots are formed in the preform 10 such that each of the slots intersects an arc of the outer surface 23 of the preform 10 within the range of from about 30° to about 180°. More preferably, multiple slots 30 are formed within the preform 10 each intersecting an arc of the outer surface 23 within a range of from about 70° to about 180°. For example, a total number of six slots 30 can be formed within the preform 10 each intersecting approximately 170°-180° of an arc of the outer surface 23, however, other numbers of slots 30 may be utilized.

In an illustrated example (FIGS. 4A-4F), the slots 32, 34, 36, 38, 40, 42 are each formed to intersect an arc a of the outer surface 23 of between 170° and 180°. Specifically, after forming the first slot 32, the preform 10 is rotated such that the second slot begins 120° from the beginning point of the first slot 32. This pattern is repeated such that the starting point of the third slot 36 is 120° rotated from the starting point of the second slot 34, the starting point of the fourth slot 38 is 180° rotated from the beginning point of the third slot 36, the beginning point of the fifth slot 40 is 120° rotated from the beginning of the fourth slot 38, and the beginning of the sixth slot 42 is 120° rotated from the beginning point of the fifth slot 40. The slots 30 of the instant example were formed via a diamond encrusted cutting wheel, however, other methods and devices suitable for such an application may be utilized, including diamond encrusted cutting wires, abrasive water jets, laser cutting, drilling, flame-working and the like. Preferably, in order to assure proper tensile and shear strength of the preform 10, the slots 32, 34, 36, 38, 40, 42 are spaced from one another along the length of the preform 10 by a distance d, defined as the distance between the centerline (e.g., WA, IVB) of each adjacent pair of slots 30. Preferably, the distance d is within the range of from about 1 mm to about 5 mm. Moreover, and for similar reasons, the width w of each of the slots 32, 34, 36, 38, 40, 42 is within the range of from about 1 m to about 4 mm. The slots 32, 34, 36, 38, 40, and 42 in preform 10 may be fire polished subsequent to forming the slots therein to remove or reduce microcracks formed within the slots of preform 10 during formation thereof.

Subsequent to forming the slots 30 within the preform 10, a first glass tube 44 (FIG. 5) is secured to the first end 22 of the preform 10. Specifically, the first tube 44 includes a proximate end 46 that is flame-worked to the first end 22 of the preform 10, such that there is a gas tight seal therebetween. The first tube 44 is secured to the preform 10 such that the first tube 44 is in pneumatic communication with the hollow core 16. The distal end 48 of the first tube 44 is in pneumatic communication with a first pressure control system (not shown). A proximate end 50 of a second glass tube 52 is flame-worked to the outer surface 23 of the preform 10, such that the second tube encapsulates at least a portion of the preform. In this way, the interior of the second tube 52 is in pneumatic communication with the slots 30. One end 50 of the second tube 52 is preferably flame-worked to the outer surface 23 of the preform 10. A supply line 55 is flame-worked to an outer surface 57 of the second tube 52 such that the supply line 55 is in pneumatic communication with the second tube 52 via an aperture 59 within the second tube 52. The supply line 55 is in pneumatic communication with a second pressure control system (not shown). In the illustrated example, the second tube 52 is configured such that a portion of the preform 10 and the first tube 44 is received therein. For example, the first tube 44 can be slidably retained within distal end 54 of second tube 52. Alternatively, the first tube 44 can be flame worked so that it is rigidly retained within distal end 54 of second tube 52. Although the first tube 44 and the second tube 52 may be attached to the preform 10 by flame-working, other methods and processes suitable for such applications may also be utilized, such as a glass fit, laser welding, O-ring seals, epoxy, and the like.

In a manner as known in the art, the preform 10 is drawn from the second end 20 thereof to reduce the diameter thereof and preferably form an optical fiber. If the preform 10 (FIG. 3) is drawn into a fiber with a single pressure being applied to the holes 14 and the hollow core 16, substantial distortion of the microstructure may result. In particular, the hollow core 16 is distorted to be much larger in size relative to the holes 14 of the photonic crystal cladding. In some embodiments of the invention, i.e., those wherein the diameter of core 16 is greater than the diameter of the holes 14, a lower pressure than is employed within the holes 14 can be employed within the core 16 to maintain the relative size of the core 16 with respect to the holes 14. However, if the core diameter was smaller than the relative diameters of the holes 14, it is likely that one would want to utilize a greater pressure in the core 16 than in the holes 14.

As a result, it is desirable to have independent control of the pressure within the hollow core 16 and the holes 14. During the drawing of the fiber, the first pressure control system may be set to a different pressure than the second pressure control system. For example, the skilled artisan may set the pressure of the first pressure control system to be greater than the pressure of the second pressure control system in order to maintain the relative sizes of the hollow core 16 and the holes 14 relative to one another, thereby avoiding the distortion described above. In cases where two independent pressure control system are used, the first pressure control system may be set to a substantially different pressure than the second pressure control system. By controlling the pressures provided by the pressure control system, the skilled artisan can control the pressures inside the holes 14 and hollow core 16 at the second end 20 of the preform 10, from which the fiber is being drawn. The skilled artisan can control the pressures inside the cores 16 and the holes 14 to expand, maintain, or reduce the relative diameters of the holes during the draw. Moreover, although it is known to utilize gases such as helium, argon, nitrogen and the like during the draw step, the present inventive method allows the gases as inserted into the core 16 and the holes 14 to differ from one another. For example, the first pressure (i.e., that which is contact with holes 14) may include from about 10-300 Torr and the second pressure (i.e., that which is in contact with the hollow core 16) may include from about 5-75 Torr during a fiber draw operation. It is further noted that the first and second pressures may also be applied as a vacuum.

Feedback control may be utilized to control the pressure of at least one the pressure control systems. For example, the sizes of the holes may be monitored, and the size and information used as part of a feedback system to control relative pressures. Alternatively, a pressure monitor may be coupled to the hollow core 16 and/or the holes 14, and the pressure information therefrom used as part of a feedback system to control the relative pressure.

The present inventive methods disclosed herein allow practical, robust and repeatable solutions for manufacturing hollow-core microstructured optical fibers. These methods reduce the time, expense and complexity of the process normally associated with the manufacture of hollow-core microstructured optical fibers and are particularly well suited for the proposed tasks.

It will become apparent to those skilled in the art that various modifications to the preferred embodiment of the invention as described herein can be made without departing from the spirit or scope of the invention as defined in the appended claims. Thus, it is intended that the present invention covers the modifications and variations of this invention provided they come within the scope of the appended claims and the equivalents thereto.

The invention claimed is:

1. A method of fabricating a photonic crystal or photonic band gap optical fiber, comprising:
   providing a preform that includes a plurality of holes and an outer surface, the holes extending from a first end of the preform to a second end of the preform;
   forming at least one radially inwardly extending slot within the preform such that the at least one slot intersects at least some of the holes, wherein the at least one slot does not intersect at least one of the holes;
   establishing a first pressure in the holes intersected by the at least one slot by introducing the first pressure to the at least one slot;
   establishing a second pressure in the at least one hole not intersected by the at least one slot by introducing the second pressure to an end of the at least one hole not intersected by the at least one slot; and
   drawing the preform into a fiber while independently controlling the first and second pressures.

2. The method of claim 1, wherein the step of drawing the preform into a fiber includes independently controlling the first and second pressures such that the second pressure is different than the first pressure during at least a portion of the drawing step.

3. The method of claim 1, wherein the at least one slot comprises at least two slots each intersecting an arc of the outer surface of the preform within a range of from about 30° to about 180°.

4. The method of claim 3, wherein the at least two slots intersect the arc of the outer surface of the preform within a range of from about 70° to about 180°.

5. The method of claim 4, wherein the at least two slots intersect the arc of the outer surface of the preform within a range of from about 170° to about 180°.

6. The method of claim 3, wherein the at least two slots are spaced from one another along the length of the preform by a distance of about 1 millimeter to about 5 millimeters.

7. The method of claim 1, wherein the step of forming the at least one slot includes forming six slots each intersecting an arc of from about 170° to about 180° of the outer surface of the preform and each defining a beginning point, and wherein the step of forming the slots includes forming the slots such that the beginning point of a second slot of the six slots is offset approximately 120° from the beginning point of a first slot of the six slots, the beginning point of a third slot of the six slots is offset approximately 120° from the beginning point of the second slot, the beginning point of a fourth slot of the six slots is offset approximately 180° from the beginning point of the third slot, the beginning point of a fifth slot of the six slots is offset approximately 120° from the beginning point of the fourth slot, and the beginning point of a sixth slot of the six slots is offset approximately 120° from the beginning point of the fifth slot.

8. The method of claim 1, further comprising, subsequent to said forming at least one radially extending slot step and prior to said establishing a first pressure step, heat treating at least one of said at least one slots sufficiently to reduce microcracks in said slot.

9. The method of claim 1, wherein the at least one slot comprises at least two slots each having a centerline, and wherein the centerline of each pair of adjacent slots are spaced from one another a distance greater than about 1 mm.

10. The method of claim 1, further comprising:
    closing at least some of the holes at the first end of the preform by heating and deforming the first end of the preform prior to establishing the second pressure.

11. The method of claim 10, further comprising:
    passing a gas through at least one of the holes of the preform simultaneous with the closing at least some of the holes at the first end of the preform, thereby inhibiting closure of the at least one of the holes of the preform receiving the gas.

12. The method of claim 10, further comprising:
    securing a first tube to the first end of the preform such that the first tube is in pneumatic communication with the at least one hole of the preform not closed at the first end thereof, and wherein the second pressure is communicated with the at least one hole of the preform not closed at the first end through the first tube.

13. The method of claim 12, further comprising:
    providing a second tube that encapsulates at least a portion of the preform; and
    securing the second tube to the outer surface of the preform such that the second tube is in pneumatic communication with the at least one slot, and wherein the first pressure is communicated with the at least one slot of the preform through the second tube.

14. The method of claim 1, further comprising inserting a plug into at least one of the holes of the preform simultaneous with closing the at least some of the holes at the first end of the preform, thereby inhibiting closure of the at least one of the holes, and thereafter removing the plug.

15. The method of claim 1, further comprising:
    providing a tube that encapsulates at least a portion of the preform therein; and
    securing the tube to the outer surface of the preform such that the tube is in pneumatic communication with the at least one slot, and wherein the first pressure is communicated with the at least one slot of the preform through the tube.

16. A method of fabricating a photonic crystal or photonic band gap optical fiber, comprising:
    providing a plurality of elongate glass tubes, each having a longitudinal axis, a first end and a second end, at least some of the glass tubes being capillaries each having a hole parallel to the longitudinal axis of the glass tube and running from the first end of the glass tube to the second end of the glass tube;
    forming the glass tubes into a stack, the glass tubes being arranged such that the longitudinal axis of each of the glass tubes is substantially parallel to one another;

heating the stack and drawing the stack to form a preform, the preform having a first end and a second end, a plurality of holes, and an outer surface;

closing at least some of the holes of the preform at the first end of the preform by heating and deforming a first end of the preform;

forming a plurality of radially inwardly extending and longitudinally spaced slots within the preform such that each of the slots intersect at least some of the holes, wherein the slots do not intersect all of the holes;

securing a first tube to the first end of the preform such that the first tube is in pneumatic communication with at least some of the holes of the preform not intersected by the slots;

securing a second tube about the outer surface of the preform such that the second tube is in pneumatic communication with the slots;

establishing a first pressure in the holes intersected by the slots by introducing a first pressure to the slots through the second tube;

establishing a second pressure in the holes of the glass tubes not intersected by the slots by introducing the second pressure through the first tube; and reducing the diameter of the preform while independently controlling the first and second pressures.

17. The method of claim 16, where the reducing the diameter step comprises drawing the preform into a fiber.

18. The method of claim 16, wherein the step of drawing the preform into a fiber includes independently controlling the first and second pressures such that the second pressure is different than the first pressure during at least a portion of the drawing step.

19. The method of claim 16, further comprising:
passing a gas through at least one of the holes of the preform simultaneous with closing at least some of the holes at the first end of the preform, thereby preventing closure of at least one of the holes of the preform.

20. The method of claim 16, wherein the step of forming the slots includes forming the slots to intersect an arc of the outer surface of preform within a range of from about 170° to about 180°.

* * * * *